Oct. 21, 1958   J. T. MAYNARD   2,857,217
THRUST BEARING
Filed Sept. 2, 1955

INVENTOR.
JOHN T. MAYNARD
BY Andrus & Scales
Attorneys

United States Patent Office 2,857,217
Patented Oct. 21, 1958

2,857,217

THRUST BEARING

John T. Maynard, West Allis, Wis., assignor to A. O. Smith Corporation, Milwaukee, Wis., a corporation of New York Application September 2, 1955, Serial No. 532,199

1 Claim. (Cl. 308—160)

This invention relates to thrust bearings and particularly to a segmental or shoe-type thrust bearing.

A segmental-type thrust bearing, more commonly known as a Kingsbury bearing named after the originator of the bearing, comprises, in general, a plurality of tiltably or flexibly mounted arcuate bearing segments or shoes which cooperate with a bearing ring to take up the thrust forces exerted on a drive shaft.

An object of the present invention is to provide a segmental thrust bearing having optimum load characteristics.

Another object of the present invention is to provide an improved pivot construction for supporting the shoes.

A further object of the present invention is to provide an improved unitary pivot and spacing structure for the shoes and pivot.

In accordance with the present invention, the thrust bearing is provided with three thrust shoes, each of which is tiltably supported and detained by a spherical member. The spherical member is in turn placed within a bearing seat which also acts to hold the member in place. The shoes are arcuately shaped and circumferentially spaced to form a broken annular bearing surface. The arc length encompassed by the shoes is substantially ninety degrees such that there is substantially a thirty degree spacing between adjacent shoes.

The drawing furnished herewith illustrates the best mode presently contemplated for carrying out the invention.

Figure 1:
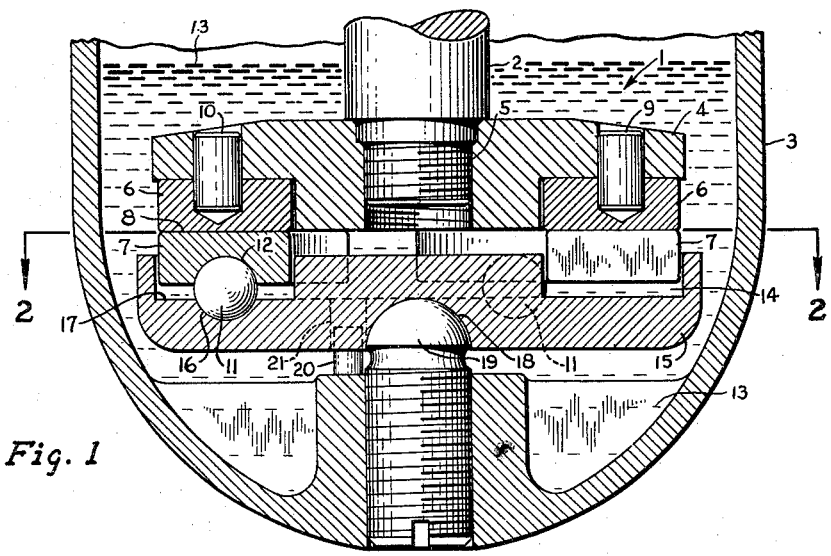
Figure 1 is a sectional view of a thrust bearing supporting a vertical rotatable shaft.

Referring to Figure 1, a thrust bearing 1 is disposed to take up the thrust forces from a vertical drive shaft 2 and transmit them to a relatively stationary housing 3 or other relatively stationary support.

The vertical shaft 2 is any rotating shaft having an axial force acting thereon. For example, a submersible motor shaft which is connected to drive a well pump.

In a submersible motor, the housing 3 is integral with the motor casing, not shown.

The thrust bearing 1 comprises a disc-shaped thrust block 4 which is centrally tapped and threadedly engaged with the end 5 of shaft 2. The block 4 has a peripheral recess on its lower surface which receives an annular thrust collar 6. The thrust block 4, being securely attached to the shaft 2, transmits the axial forces on shaft 2 to three fixed bearing segments or shoes 7 through the collar 6.

The collar 6 is secured to the block 4 with its contact face 8 in contiguous relation with the shoes 7 by a pair of pins 9 and 10 which extend through suitable openings in block 4 and register with aligned recesses in the upper surface of the collar. Consequently, the collar 6 transmits the thrust force onto the shoes 7 through the sliding contact face 8.

Figure 2:
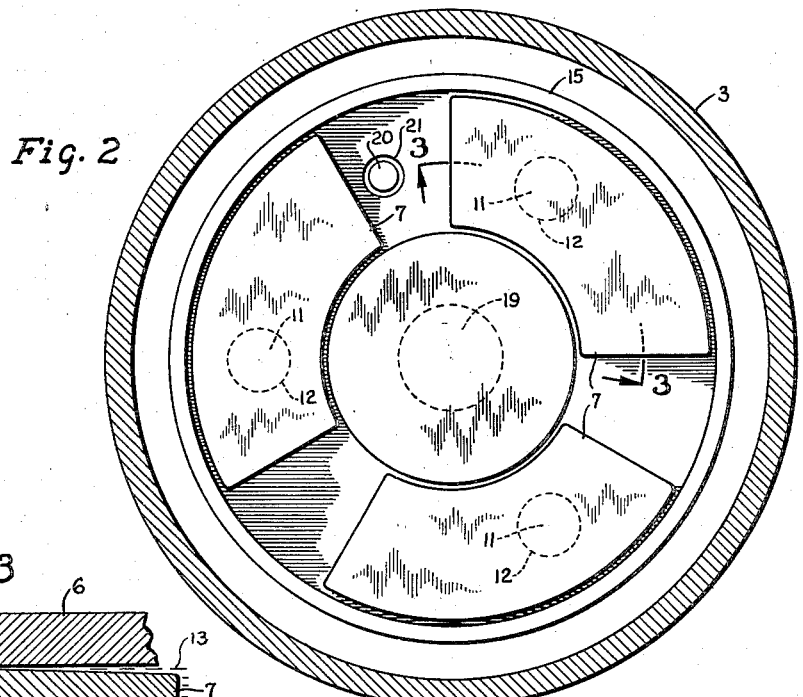
Fig. 2 is a view taken on the line 2—2 of Figure 1.

As best shown in Fig. 2, there are three circumferentially spaced stainless steel bearing shoes 7 each of which is generally arcuate in shape and subtends an arc of substantially 90 degrees. The shoes each have a radial width corresponding to the width of the annular thrust collar 6. The shoes 7 are equally spaced about the axis of the shaft 2 to provide substantially thirty degrees between the edges of adjacent shoes. Each shoe 7 is pivotally mounted on a single ball bearing 11 journaled within a recess 12 having a spherical contour and formed in the lower surface of the shoes. Referring particularly to Fig. 1, the ball bearings 11 and the recesses 12 have complementing radii to provide a generally hemispherical bearing surface. The depth of the recess is somewhat less than the radius of the ball bearing and the recess. This serves to retain the shoes 7 upon the ball bearings without the usual cage or pin retaining structure.

Figure 3:
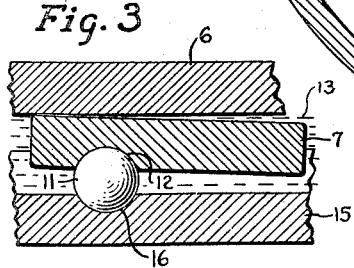
Figure 3 is a fragmentary view taken on line 3—3 of Fig. 2 and showing the position of a bearing block, collar and shoe during rotation of the shaft.

With a constant rotational shaft, such as that from a non-reversible motor, the recess 12 is slightly displaced from the center of the arc subtended by the shoe in the direction of shaft rotation, as shown in Figs. 2 and 3. This results in an off-center pivotal support of the shoe which then tilts and permits a lubricant 13 to more easily enter between the shoe and the collar, as shown in Fig. 3. In a reversible drive shaft, such as that from a reversible motor, the recess 12 is centered. Otherwise, when the shaft is rotoring in a reverse direction, the tilt of the shoes would tend to exclude the lubricant and prevent necessary lubrication of the bearing.

The lubricant 13 is shown as filling the casing or housing 3. This is one of the conventional modes of providing a source of lubricant in submersible motors. The lubricant 13 is water, oil or other suitable lubricating medium.

The shoes 7 are supported within an annular groove 14 provided in the upper surface of a disc-shaped pressure equalizing plate 15. Three equally and circumferentially spaced recesses 16 are formed in the bottom 17 of the groove 14 to receive the shoe supporting ball bearings 11. The recesses 16 have a spherical contour and have the same radius as the ball bearings 11. The depth of the recesses 16 is approximately equal to two-thirds the radius of the recesses and consequently the shoes are maintained in spared relation to the bottom of groove 17 to allow tilting of the shoes.

Due to the thrust pressure applied on the ball bearings 11, they are held in the recesses 16 and thereby maintain the pivotal spacing of the shoes 7 without the conventional cage structure.

To prevent the shoes from rotating in a horizontal plane about the ball bearing, the depth of the groove 14 is such that the shoes 8 are confined within the walls of the groove.

The lower surface of the equalizing plate 15 is provided with a central hemispherical bearing seat 18 which pivots on a hemispherical projection 19 extending inwardly from the casing 3 to provide a conventional spherical leveling surface. The equalizing plate 15 tilts in response to any variation of pressure on the individual shoes 7 to redistribute and equalize the loads thereon.

To prevent rotation of the plate 15 about the axis of the shaft 2, a pin 20 extends from the casing into an aperture 21 formed in the plate. The pin 20 fits loosely within the aperture 21 so as to allow the noted tilting movement of the plate 15.

The present invention provides an improved segmental shoe-type thrust bearing with the optimum bearing shoe size and space between the shoes. The present invention also eliminates the conventional cage retainer by provision of a novel and improved shoe and pivot retaining means.

Various modes of carrying out the invention are contemplated as being within the scope of the following claim particularly pointing out and distinctly claiming the subject matter which is regarded as the invention.

I claim:

A thrust bearing for supporting a rotor and rotor shaft of a submersible motor, which comprises a thrust bearing block unit threaded to the shaft as the sole means of attachment and adapted to rotate therewith, three bearing shoes circumferentially and equally spaced about the axis of the shaft and having a bearing surface in contacting relation with said thrust block unit to provide a sliding contact therebetween, said shoes each being generally arcuately shaped and encompassing an arc of essentially ninety degrees, each shoe having a recess in the surface thereof opposite the bearing surface to provide a tilting bearing seat, a ball bearing supported in bearing engagement within the recess of each shoe, a pressure equalizing plate having an annular channel in the upper surface and adapted to be supported with the channel and the shoes in superposed relation, the bottom of said channel having three equally and circumferentially spaced recesses adapted to receive said ball bearings, said last named recesses having a generally spherical contour of the radius of said ball bearings and having a depth of approximately two-thirds the radius of the ball bearings to support the shoes within the channel and in spaced relation to the channel base, said recesses in the bottom of the channel maintaining the ball bearings in circumferentially spaced relation and thereby preventing circumferential movement of said thrust shoes, a generally spherical bearing means extending inwardly from the lower end of the motor in alignment with the motor shaft and engaging the lower surface of the equalizer plate to support the equalizer plate, and means extending upwardly from said bearing means in radially spaced relation to said engagement with the equalizer plate and into engagement with said equalizer plate to prevent the equalizer plate from rotating about the shaft axis.

References Cited in the file of this patent

UNITED STATES PATENTS

| 1,117,499 | Kingsbury | Nov. 17, 1914 |
| 1,117,504 | Kingsbury | Nov. 17, 1914 |
| 1,207,071 | Parsons | Dec. 5, 1916 |
| 2,602,713 | Hatcher | July 8, 1952 |
| 2,779,637 | Schaefer | Jan. 29, 1957 |

FOREIGN PATENTS

| 714,650 | Great Britain | Sept. 1, 1954 |